United States Patent [19]

Vulcano

[11] 4,447,715

[45] May 8, 1984

[54] SORTING MACHINE FOR SORTING COVERS

[76] Inventor: Vincent Vulcano, 301 E. 48th St., New York, N.Y. 10017

[21] Appl. No.: 323,295

[22] Filed: Nov. 20, 1981

Related U.S. Application Data

[63] Continuation-in-part of Ser. No. 202,124, Oct. 30, 1980, which is a continuation of Ser. No. 21,467, Mar. 19, 1979, abandoned.

[51] Int. Cl.$^3$ .......................... G06K 7/10; G06K 7/14
[52] U.S. Cl. .................................... 235/454; 235/429; 235/458
[58] Field of Search ............... 235/375, 437, 438, 429, 235/458; 209/580, 534, 583, 584; 382/14, 61

[56] References Cited

U.S. PATENT DOCUMENTS

| | | | |
|---|---|---|---|
| 2,760,404 | 8/1956 | King | 235/469 |
| 3,414,126 | 12/1968 | Vulcano | 209/580 |
| 3,493,729 | 2/1970 | Hilal | 235/474 |
| 3,521,235 | 7/1970 | Becker | 382/14 |
| 3,738,487 | 6/1973 | Way | 209/583 |
| 3,886,325 | 5/1975 | Dorr | 235/429 |
| 4,066,999 | 1/1978 | Spanjersberg | 382/14 |
| 4,166,540 | 9/1979 | Marshall | 209/583 |

Primary Examiner—Harold I. Pitts
Attorney, Agent, or Firm—Stephen E. Feldman

[57] ABSTRACT

A sorting machine for sorting covers comprises a transport device for moving the covers along a path through the sorting machine. A feed mechanism holds the covers and advances them towards the transport device. A vacuum feed has a first position for gripping a cover in the feed mechanism and a second position for feeding the gripped cover into the transport device. Additionally, the covers are passed in front of a recognition device which is operatively connected to a computer. The computer recognizes the covers to be sorted and instructs the sorting machine accordingly.

12 Claims, 11 Drawing Figures

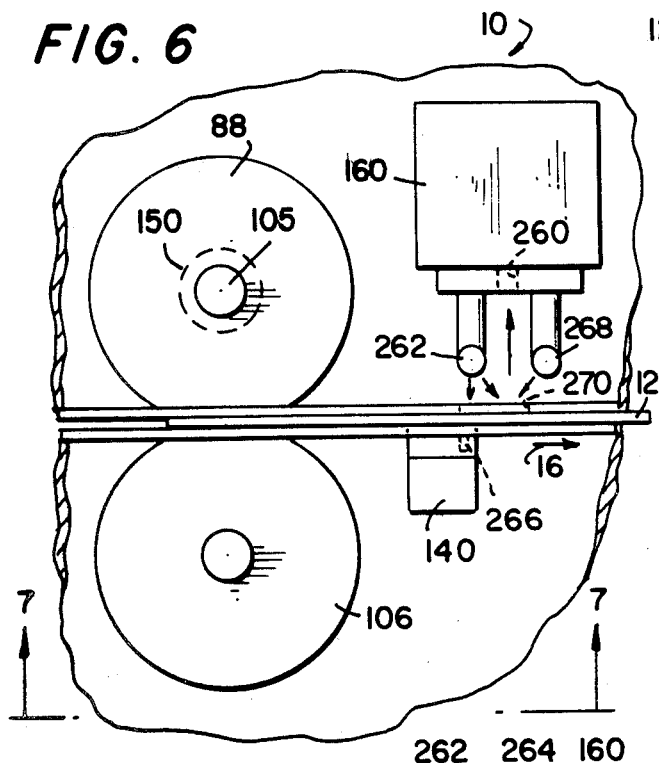
FIG. 6
FIG. 7
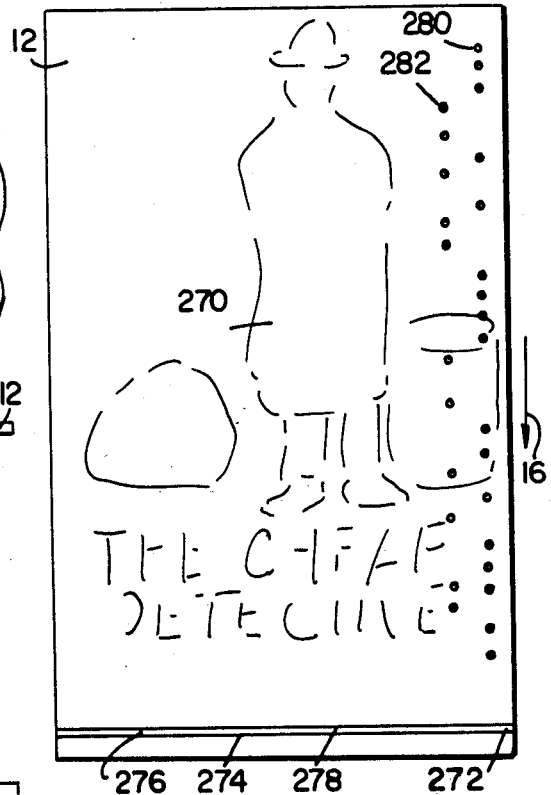
FIG. 8
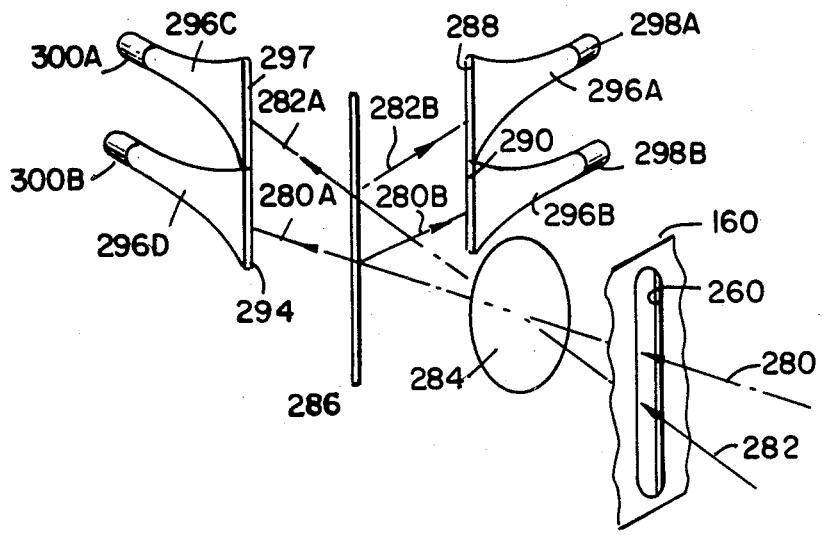
FIG. 9

SORTING MACHINE FOR SORTING COVERS

FIELD OF THE INVENTION

This application is a continuation-in-part of Ser. No. 202,124, filed Oct. 30, 1980, which is a continuation application of Ser. No. 021,467, filed Mar. 19, 1979 now abandoned.

BACKGROUND OF THE INVENTION

This invention relates to cover sorting machines.

While the invention is subject to a wide range of applications, it is especially suited for use in a book cover sorting system and will be particularly described in that connection.

In recent times, the paperback book industry has grown significantly and now publishes hundreds of millions of paperbacks yearly. A large percentage of these paperback books, running into the hundreds of millions, are not sold and are returned to the publisher or wholesaler for reimbursements. These returns are extremely expensive to handle and difficult to store. Also, the problems of properly crediting accounts is a massive operation. One partial solution of this problem has been to return only the cover of the paperback to the publisher or wholesaler for proper crediting. In this way the difficulty in handling the physical bulk of the books is greatly reduced. However, the recognition and processing of these paperback covers still remains. In the past, cover sorting machines have been used to sort covers and recognize them so that the information can be readily accessible and useable in various ways.

For example, U.S. Pat. No. 3,414,126 to Vulcano discloses along a conveyor of plurality of sorting stations each including a photoelectric detector which is positioned along the conveyor to ascertain the presence of a particular marking, individual to the respective station, on the cover of an oncoming book.

U.S. Pat. No. 3,511,368 to Kajitani et al discloses for example, a feeding and conveying apparatus for recording media such as envelopes and postcards wherein a plurality of stacked written mediums are successively paid out one after the other from the front end of the stock. An information item is read on the foremost written medium while it is held stationary before it is paid out and a conveyor conveys the written medium along a predetermined path according to the read out information.

U.S. Pat. No. 3,998,329 to Araya and Hashimoto discloses a card sorting apparatus and its system wherein the cards are stacked in the original order accumulated in the card hopper.

All of the above-mentioned cover sorting devices are very complicated and do not have the capability of rapidly scanning a large volume of book covers returned for credit, recognizing each title in a large library of stored classes of titles, accumulating required information with respect to such recognized titles, and transmittal of such data in a form compatible with publisher or distributor equipment and requirements.

It is an object of the present invention to provide a sorting machine which obviates some or all of the above-mentioned limitations.

It is a further object of the present invention to provide a novel sorting machine which is capable of accurately sorting many different types of covers.

It is a further object of the present invention to provide a sorting machine which operates very quickly and efficiently.

It is a still further object of the present invention to provide a sorting machine which removes covers which are stuck together or which are not recognized by the machine.

It is a still further object of the present invention to provide a sorting machine which shreds the covers which have been recognized.

SUMMARY OF THE INVENTION

Accordingly, there has been provided a sorting machine for sorting covers comprising a transport device for moving the covers along a path of movement through the sorting machine. A feed mechanism holds the covers and advances them towards the transport device. A vacuum feed has a first position for gripping a cover in the feed mechanism and a second position for feeding a gripped cover into the transport device.

For a better understanding of the present invention, together with other and further objects thereof, reference is had to the following description, taking in connection with the accompanying drawings, while its scope will be pointed in the appended claims.

BRIEF DESCRIPTION OF THE DRAWINGS

FIG. 6 is a fragmentary top view of the cover recognition portion of the present invention;

FIG. 7 is a fragmentary side view of the FIG. 6 portion viewed in the direction of arrows 7—7;

FIG. 8 is a plan view of a training cover;

FIG. 9, is a schematic view of the interior of the optical sensor device;

DESCRIPTION OF THE PREFERRED EMBODIMENT

Figure 1A:
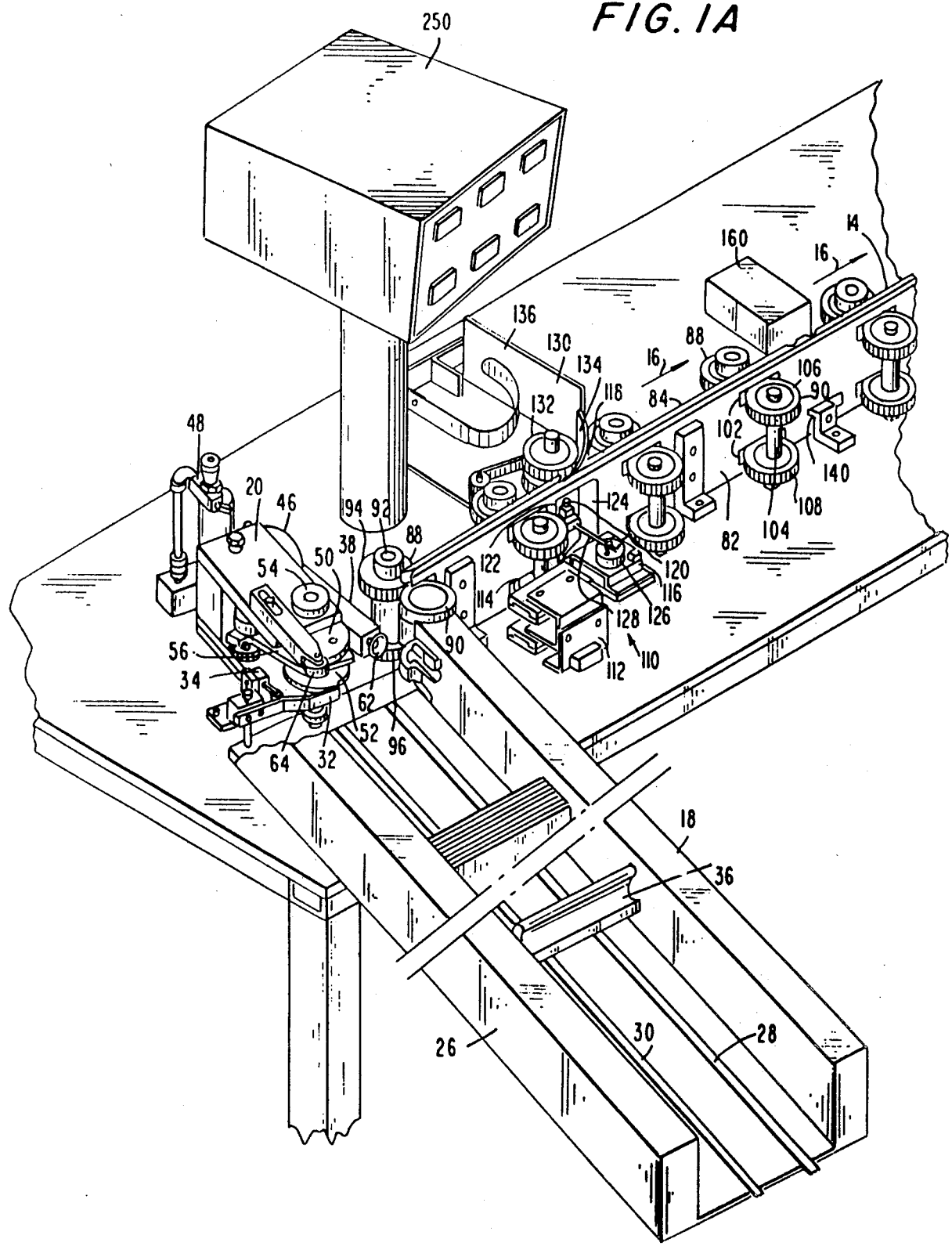
FIG. 1 is a plan view of a cover sorting machine in accordance with the present invention.

A sorting machine 10 for sorting covers 12 comprises a transport device 14 for moving the covers along a path of movement 16 through the sorting machine 10. A feed mechanism 18 holds the covers and advances them towards the transport device 14. A vacuum feed 20 has a first position for gripping a cover in the feed mechanism and a second position for feeding a gripped cover into the transport device 14.

Figure 1B:
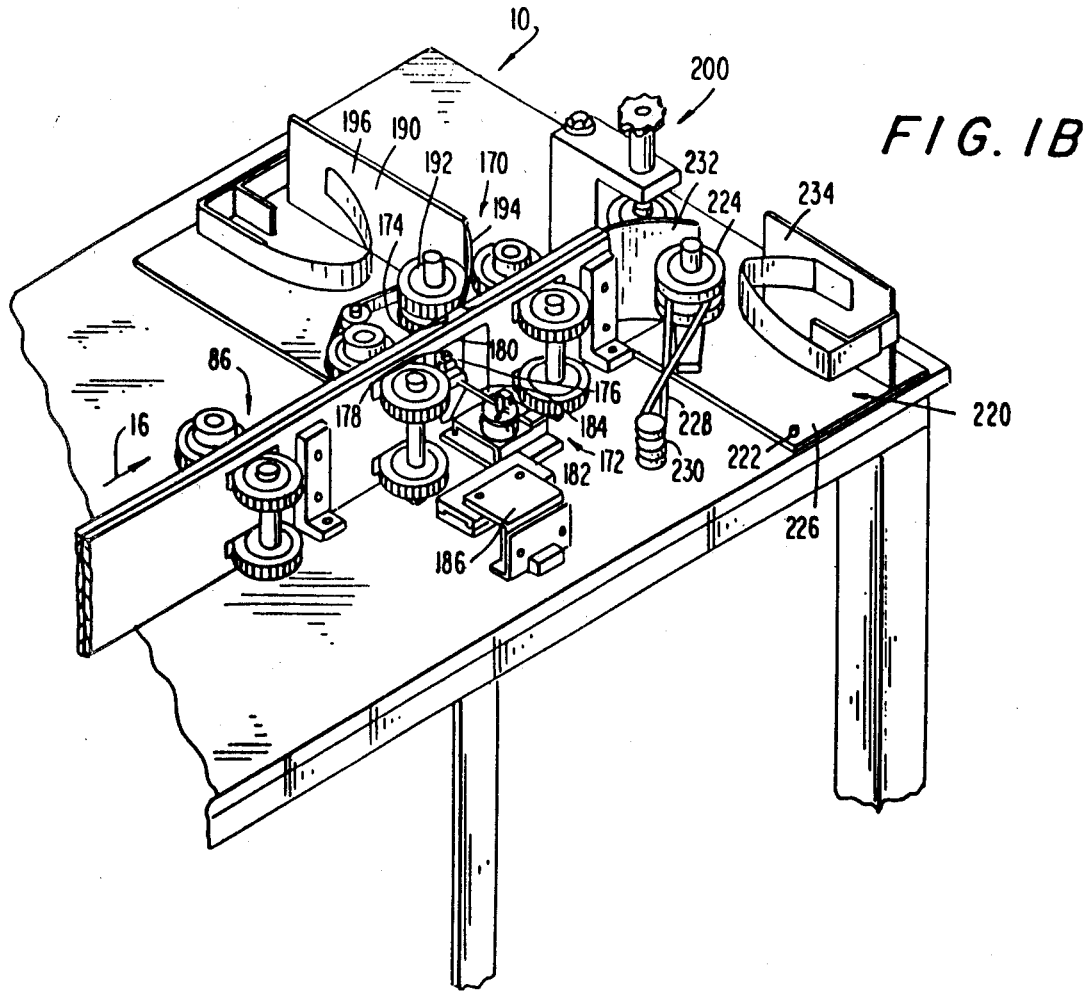

Referring to FIG. 1, there is shown a feed mechanism 18 for holding the covers 12 and advancing them toward the transport device 14. This feed mechanism includes a book cover feed hopper 26 which is large enough to hold any desired number of covers, such as approximately 1200 covers at one time. Two drive belts 28 and 30 are provided along the base of the feed hopper 26 and move toward the transport device 14 to feed the covers 12 toward the path of movement 16. These feed belts 28 and 30 are connected to a stepping motor (not shown) which is associated with a switch lever 32 and a microswitch 34. A feed plate 36 rides on the feed belts 28 and 30 and acts as a backing for the covers 12 which are supported between the feed plate 36 and the switch lever 32. During the operation of the sorting machine, the covers are fed towards the switch lever 32. When enough pressure is exerted, the lever acts against the microswitch 34 and stops the stepping motor and the forward movement of the feed belts. When enough covers are moved into the transport device 14, the switch lever can move to a position where the microswitch is open and the feed belts 28 and 30 begin moving again. It should be noted that the feed plate 36 is selfsupporting and merely rides on the feed belts.

It is also in the scope of the present invention to provide a feed plate which is directly connected to feed belts and which will turn off the machine when it contacts the switch lever 32. In this case, an additional switch may be provided to move the feed plate in the forward and rearward directions as well as a stop switch which is activated when the feed plate is in its most rearward position. More specifically, whenever desired, the feed plate could be moved in the rearward direction so that additional covers may be placed between it and the switch lever 32. Then the switch can activate the feed plate to push the covers towards the switch lever until the proper pressure is exerted and the switch lever turns the stepping motor off. Also, a stop switch may be located in the rear of the feed hopper so that the feed belts would stop moving in a rearward direction once the feed hopper had reached its most rearward position.

Figure 4:
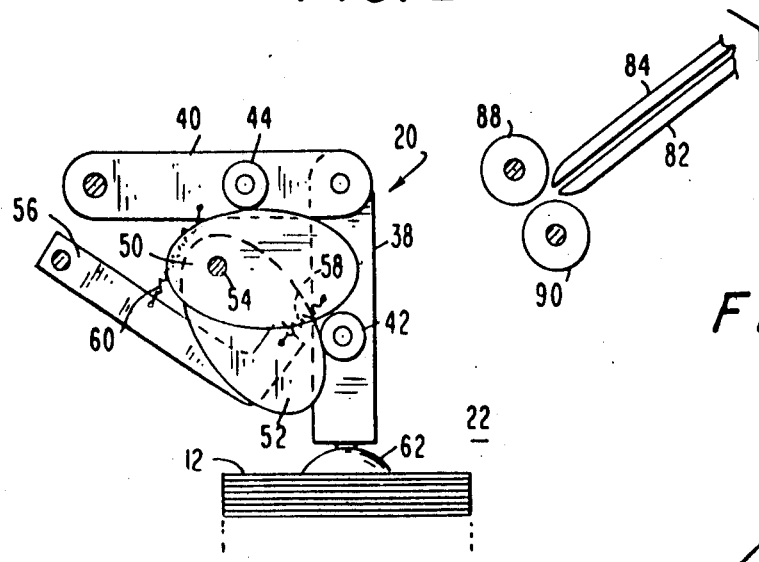
FIG. 4 is a top view of the vacuum feed of the present invention in a first position.
Figure 5:
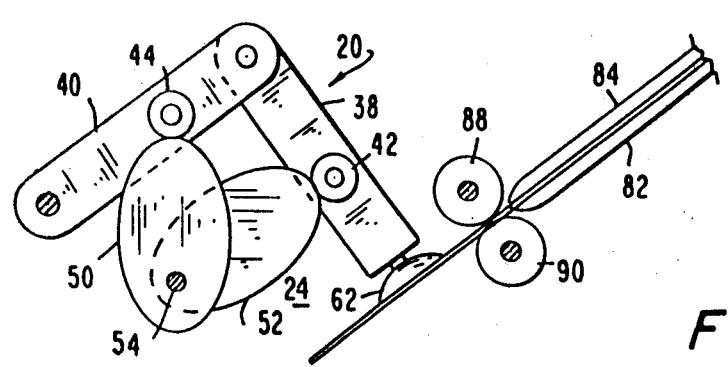
FIG. 5 is a top view of the vacuum feed of the present invention in a second position.

A vacuum feed device 20 as best seen in FIG. 1, 4 and 5, is pivotally connected to the sorting machine for rotation of movement between first and second positions 22 and 24, respectively. The vacuum feed device 20 includes a vacuum probe 38 pivotably connected to a probe arm 40. The vacuum probe and the probe arm both have a pair of cylindrical cam followers 42 and 44, respectively thereon. The vacuum probe 38 is connected via a vacuum hose 46 to a vacuum source unit 48. The vacuum source unit receives a vacuum pressure from a conventional vacuum pump (not shown). The unit 48 includes a solenoid operated vacuum breaker which connects the unit to atmospheric pressure as will be explained.

The feed device includes a pair of cams 50 and 52 mounted above each other on a shaft 54 for moving the vacuum probe between the first and second positions 22 and 24, as shown. A spring support element 56 is fixedly connected to the vacuum feed device 20 and is connected to one end of a pair of springs 58 and 60. The other end of springs 58 and 60 are connected to the vacuum probe 28 and probe arm 40, respectively and act to bias cam follower 42 against cam 52 and cam follower 44 against cam 50. The vacuum probe 38 further includes a vacuum suction head 62 which acts to grip the covers located in the feed mechanism and move them to the transport as will be more fully described.

The shaft 54 is constantly rotating in a clockwise direction. Assuming that the probe begins in an intermediate position as shown in FIG. 1, further rotation of cam 50 allows the cam follower 44 to move closer to the shaft as the minor axis of the cam 50 contacts follower 44. The biasing action of the spring 60 maintains contact between the follower 44 and the cam 50. Finally, the probe 38 is fully extended towards the feed mechanism 18 and the vacuum feed is on in the first position 22. At this point, the vacuum suction head 62 is substantially parallel to the book covers and the vacuum is provided so that the vacuum suction head 62 can grip a cover. At this time, a cover is supported by the suction head 62 and a rotating wheel 64 which is affixed to the feed device 18. As the shaft 54 continues to rotate, the major axis of the cam 50 begins to contact cam follower 44 and move the probe arm 40 away from the feed mechanism 18 whereby the cover moves towards the transport 14. During this time period, the major axis of cam 52 begins to push the cam follower 42 of vacuum probe 38 in the direction of the transport 14 until the feed mechanism is in a second position as illustrated in FIG. 5. At this instant, a vacuum is broken as will be further described and the cover is ready to enter the transport 14.

As previously mentioned, the vacuum is provided in the suction head 62 just prior to the time when the suction head contacts a cover in the first position until the vacuum feed means is in a second position as the cover is ready to move into the transport and the vacuum is broken. The vacuum is turned on and off by a solenoid actuator associated with the position of shaft 54 which is carrying the cams 50 and 52.

Figure 2:
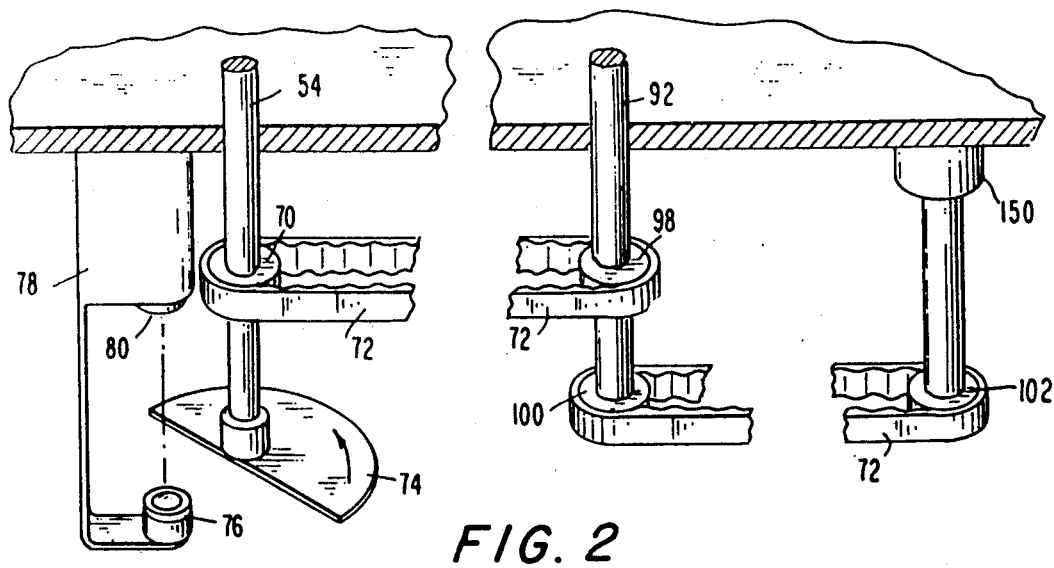
FIG. 2 is a side view, partly in cross-section of the wider side of a cover sorting machine of the present invention.

Referring to FIG. 2, a device for effecting the breaking of the vacuum is illustrated. The shaft 54 extends from the vacuum feed device 20 to the underside of the machine 10. A drive pulley 70 is affixed to the shaft and turns the latter by means of a drive belt 72 which is turned by a conventional drive motor (not shown) that also functions to operate all the drive functions of the sorting machine. At the end of the shaft 54, a light blockage plate 74 is provided. As can be seen, this plate may be shaped as a semi-circle or any other desired shape to provide the vacuum at the required time as will be further explained. A conventional light sensor 76 is affixed to the bottom of a support element 78 affixed to machine 10. A light reflector 80 is affixed above the light sensor on the support 78. The sensor 76 produces a light beam which reflects from the reflector 80 and is sensed by the sensor 76. As long as a light is sensed, sensor 76 maintains the solenoid actuator in a position so that a vacuum in the vacuum source 48 is provided to probe arm 40. However, when the light blockage plate rotates to a position which prevents the light from shining on the reflector 80 and thereby sensed by light sensor 76, the sensor actuates the solenoid actuator to break the vacuum from the vacuum source. In this manner, vacuum is provided to the vacuum probe 38 during only a portion of the rotation of the shaft 54. More specifically, the vacuum is only present in the suction head just prior to its contact with the cover as the probe moves into the first position so that it can grip the cover. The vacuum continues as the vacuum probe moves the cover to the transport 14 in the second position as shown in FIG. 5. At this time, the vacuum is broken so that the cover can easily enter the transport as will be further described.

The transport 14, as seen in FIG. 1 includes a pair of parallel guide rails 82 and 84 set along the path of movement 16 for supporting a cover as it moves along its edge through the guide rails. A plurality of wheel assemblies 86 are provided along the guide rails in order to move the covers through the rails as will be described. Each of the wheel assemblies comprises a drive wheel sub-assembly 88 and a pressure wheel subassembly 90. The drive wheel sub-assembly consists of a wheel shaft 92 having a pair of wheel elements 94 and 96 with serrated edges thereon. Each of the wheel elements extend through slots in the guide rail 84 towards the guide rail 82. Each of the wheel shafts 92 extend to the underside of the sorting machine and may have drive pulleys 98 and 100 affixed thereto. The drive pulleys are driven by drive belts 72 as previously mentioned.

The wheel assemblies 86 include pressure wheels 90 located opposite each of the drive wheels and extending through a pair of slots 102 in the guide rail 82. The pressure wheels may include a wheel shaft 104 which has a pair of pressure wheel elements 106 and 108 thereon. These pressure wheel elements may be constructed of any desirable material such as, for example, rubber. The shaft 104 may be mounted onto the sorting machine without any power drive associated therewith.

The drive and pressure wheel sub-assemblies 88 and 90 are spaced so that the distance between the wheel elements 94 and 96 and the corresponding pressure wheel elements 106 and 108 is such that a cover is frictionally received between them. The drive wheels frictionally act against one side of the cover and the pressure wheels support the other side so that the cover is moved through the guide rails from one pair of wheel assemblies 86 to another. The wheel assemblies 86 are spaced along the guide rails so that the cover is always being driven by one set of the wheel assemblies 86. Although the wheel assemblies have been illustrated with two wheel elements on each shaft, it is within the scope of the present invention for the drive wheel and the pressure wheel to consist of a single wheel element.

A double cover removal device 110 is operatively associated with the transport device for removing from the transport 14 two covers which may be attached together. The double cover removal device 110 includes a detector assembly 112 which has a detector sensing head 115 extending into the path of movement through a slot 114 in rail 82. The double cover removal assembly 110 includes a deflector device 116 for diverting covers out of the transport. The deflector device includes an exit slot 118 in the guide rail 84. A pivot gate 120 is pivotally associated with the guide rail 82 and pivots along an edge 122 of slot 124. A pivot gate actuator 126 has an arm element 128 attached to the pivot gate 120. Whenever the thickness of the covers passing between the guide rails 82 and 84 exceed a stipulated width (the thickness of two covers), the detector assembly 112 activates the pivot gate actuator 116 and moves the pivot gate 120 to block the path of movement between the two guide rails. The covers are then directed to proceed through the exit slot 118 and into an accumulation storage assembly 130.

The accumulation storage assembly 130 includes accumulation cover drive comprising a drive wheel 132 which is substantially similar to the drive wheel 88. A curved guide support 134 is adjacent the wheel 132 and acts in conjunction with wheel 132 to direct the covers into the accumulation area 136.

An optical sensor device 140 is located along the path of movement 16 and is sensitive to light passing between the guide rails 82 and 84. The sensor includes two phototransistors which perform the dual function of determining the leading and trailing edge of a cover passing the sensor and sensing light passing through holes in a training cover as will be further described.

A shaft angle encoder 150 mounted on a shaft 105 (see FIG. 2) is comprised of a conventional rotary incremental encoder physically coupled to the mechanical drive with the belt 72 and a pulley 103. The encoder puts out 1,024 pulses per each revolution of its shaft. Since the output frequency of the encoder is proportional to the speed of the drive, the encoded output may be used to take time measurements of a book cover. In other words, the shaft angle encoder is a clock which generates a frequency proportional to the speed of the drive mechanism of transport 14. More specifically, the encoder 150 is correlated with the sensor 140. The sensor measures leading and trailing edges of a cover and conveys this information to a computer (as will be later described). This latter information, allows the computer to calculate the time required for the cover to pass the sensor by delineating the passage of a single cover and relating it to the output of the shaft angle encoder which is also directed to the computer.

Directly downstream of the sensor 140 is a cover recognition device 152 which includes an optical scanner 160. The scanner 160 is adjacent the guide rail 84 which includes a scanner slot opening (not shown) whereby the scanner can see a cover passing between the guide rails 82 and 84. A light source to be described later is provided along the front edge of the scanner adjacent the guide rail 84 for illuminating the cover. This light source also provides light for the optical sensor device 140.

The optical scanner consists of a lens, color separator, light divider, light detectors, and signal amplifiers. The scanner receives light reflected from the cover as it passes in front of the lens. The lens focuses the image through the color separation mirror onto two fiberoptic bundles. Each fiberoptic bundle is divided into two smaller bundles and each of the smaller bundles is terminated with a photodiode. Two diodes see the "red" image and two diodes see the "not red" image. Then the signal amplifer converts the four diode output currents to an output voltage and it is transferred to a computer as will be further described.

It should be noted that the output voltage of the optical scanner created by a cover is considered by the computer during the time between the leading and trailing edge of the cover passing in front of the scanner as determined by the information generated by the shaft angle encoder 150 in conjunction with the optical sensor device as will be described.

A non-detected cover removal device 170 is operatively associated with the transport 14 for removing from the transport covers not identified by the cover recognition device 152. The cover removal device 170 includes a deflector apparatus 172 for diverting the non-identified covers out of the path of movement. The cover removal device 170 has an exit slot 174 in the guide rail 84. A pivot gate 176 is pivotably attached to an edge 178 of a gate opening 180 located opposite the exit slot 174. A pivot gate actuator 182 moves the pivot gate 176 with a pivot rod 184. The gate actuator 182 acts in response to a deflector assembly 186 which receives information from a computer in response to the optical scanner 160 viewing a nonidentifiable cover. The pivot gate actuator 182 moves pivot gate 176 to block the path of movement and force the cover to pass through the exit slot 174 into an accumulation storage assembly 190. The storage assembly 190 includes a driving wheel 192 which is adjacent a curved support wall 194. A cover fed between the driving wheel and support wall is forced to move into an accumulation area 196.

Figure 3:
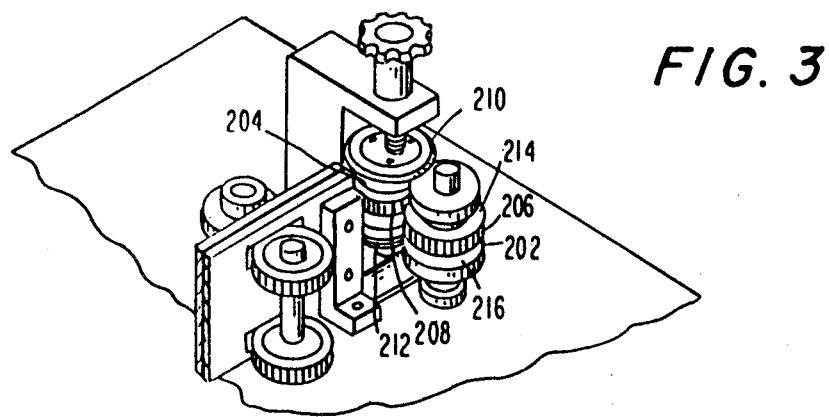
FIG. 3 is a plan view of shredding device in accordance with the present invention.

At the end of the transport 14, a shredder apparatus 200 is provided for shredding the covers passing therethrough. As best seen in FIG. 3, the cover shredder includes two wheel assemblies 202 and 204 each having a drive wheel portion 206 and 208 respectively. Drive wheel assembly 204 includes two cutting discs 210 and 212 thereon. The wheel assembly 202 includes cutting disc supports 214 and 216 with which the cutting discs 210 and 212 act. Thus, when a cover passes between the two wheel assemblies, the cutting discs 210 and 212 shred the covers into three parts.

Referring to FIG. 1, there is illustrated a training bin assembly 220 which is provided to accumulate training cards as will be further described. The training bin assembly 220 is removably attached to the sorting machine by any desired device, such as for example, bolt 222. A drive wheel 224 is affixed onto a plate 226 of the bin assembly 220. The drive wheel is rotated by a belt 228 which is wound about a drive pulley 230. The drive pulley may be driven by the mechanical drive, previously mentioned, located beneath the machine. The training bin assembly also includes a curved support plate 232 associated with the drive wheel 224. When the training bin assembly is in place, the plate 232 is located adjacent the guide rail 84 so that the covers passing along the path of movement feed between the plate 232 and the drive wheel 224 to enter into an accumulation area 234. Thus, when the training bin assembly is provided on the machine, the covers do not pass through the shredder and are stored for other purposes as will be further explained.

The control electronics are located in a pedestal mounted box 250. The control electronics interact with the computers and perform functions including starting and stopping the mechanical drive, starting the feed mechanism 18, and indicating whether 14 is jammed or if the accumulation-storage assembly 130 or 190 is full.

FIG. 6 shows details of the cover recognition portion of the present invention. The fragmentary portion of the sorting machine 10 is seen with the optical scanner 160 attached. Also shown is one of the covers 12 being guided between the guide rail 82 and the guide rail 84. An opening 270 in the guide rail 84 permits light from a lamp 262 and a lamp 264 to illuminate the book cover 12. It has been found that lamps 262 and 264 must be operated at a frequency of approximately 1000 cycles to avoid the introduction of electrical noise into the detection system. Light from the lamp 262 also can be detected by the sensor 140 which has an optical detector 206 and an optical detector 268 (FIG. 7) mounted therein. The unmarked arrows going away from lamp 262 and lamp 264 show how light from the lamps will illuminate cover 12. The unmarked arrow going away from cover 12 shows how light from the cover enters the optical scanner 160 through a slot 260. To the left of the optical scanner 160 is seen the pressure wheel subassembly 88 which together with wheel 106 move cover 12 in front of the optical scanner 160. Attached to the shaft 105 of the pressure wheel sub-assembly 88 is the shaft angle encoder 150.

FIG. 7 is a sectional view taken in the direction of arrows 7—7 showing a plan view of cover 12 and slot 260. All other elements are the same as FIG. 6.

FIG. 8 illustrates a typical cover 12 which is sorted by sorting machine 10. A FIG. 270 which is part of cover 12 is printed in color as is the rest of cover 12. As the cover 12 passes in front of optical scanner 160 a window 272 is seen by the optical scanner 160. The window 272 as viewed by optical scanner 160 is divided at the mid-point 274 into an upper portion 276 and a lower portion 278. FIG. 8 illustrates how a typical cover 12 appears except for an upper set of identification holes 282 and a lower set of identification holes 280. The set of holes 280 and 282 only appear in a training cover. The arrow 16 below the cover 12 shows the direction of cover 12 movement through the transport mechanism. The set of holes 280 and 282 are disposed so as to pass in front of the photodiodes of sensor 12.

FIG. 9 is a schematic representation of the internal optics of optical scanner 160. The slot 260 is shown in a fragmentary portion of optical scanner 160. An upper ray 280 which represents light from the upper portion 276 of cover 12 passes through a lens 284 and impinges on a color separation mirror 286. Similarly a lower ray 282 which represents light from the lower portion 278 of cover 12 passes through lens 284 and impinges on mirror 286. Mirror 286 is shown on edge in this representation.

The upper ray 280 separates into two portions after impinging on mirror 286, an upper red portion 280A and an upper not red portion 280B. Similarly the lower ray 282 separates into two portions after impinging on mirror 286, a lower red portion 282A and a lower not red portion 282B. The aforementioned light beams from cover 12 are focused upon 4 fibre optic windows. Therefore upper red portion 280A is focused on a fibre optic window 294 and lower red portion 282A is focused on fibre optic window 292. Similarly upper not red portion 280B is focused on fibre optic window 290 and lower not red portion 282B is focused on a fibre optic window 288. Because of the reciprocal nature of optical systems the upper and lower portions 276 and 278 of window 272 in FIG. 8 can be considered to be formed of the fibre optic windows 292 and 294 or 288 and 290 projected onto the cover 12.

Each fibre optic window is optically matched to a photodiode by means of an optical transformer generally designated 296. The optical transformer efficiently couples the light impinging on the narrow window to the circular form of the photodiode. Therefore each fibre optic window 288, 290, 292 and 294 has its respective optical transformer 296A, 296B, 296C and 296D. Coupled to the circular ends of the respective optical transformers are a lower not red photodiode 298A, an upper not red photodiode 298B, a lower red photodiode 300A and an upper red photodiode 300B.

Figure 10:
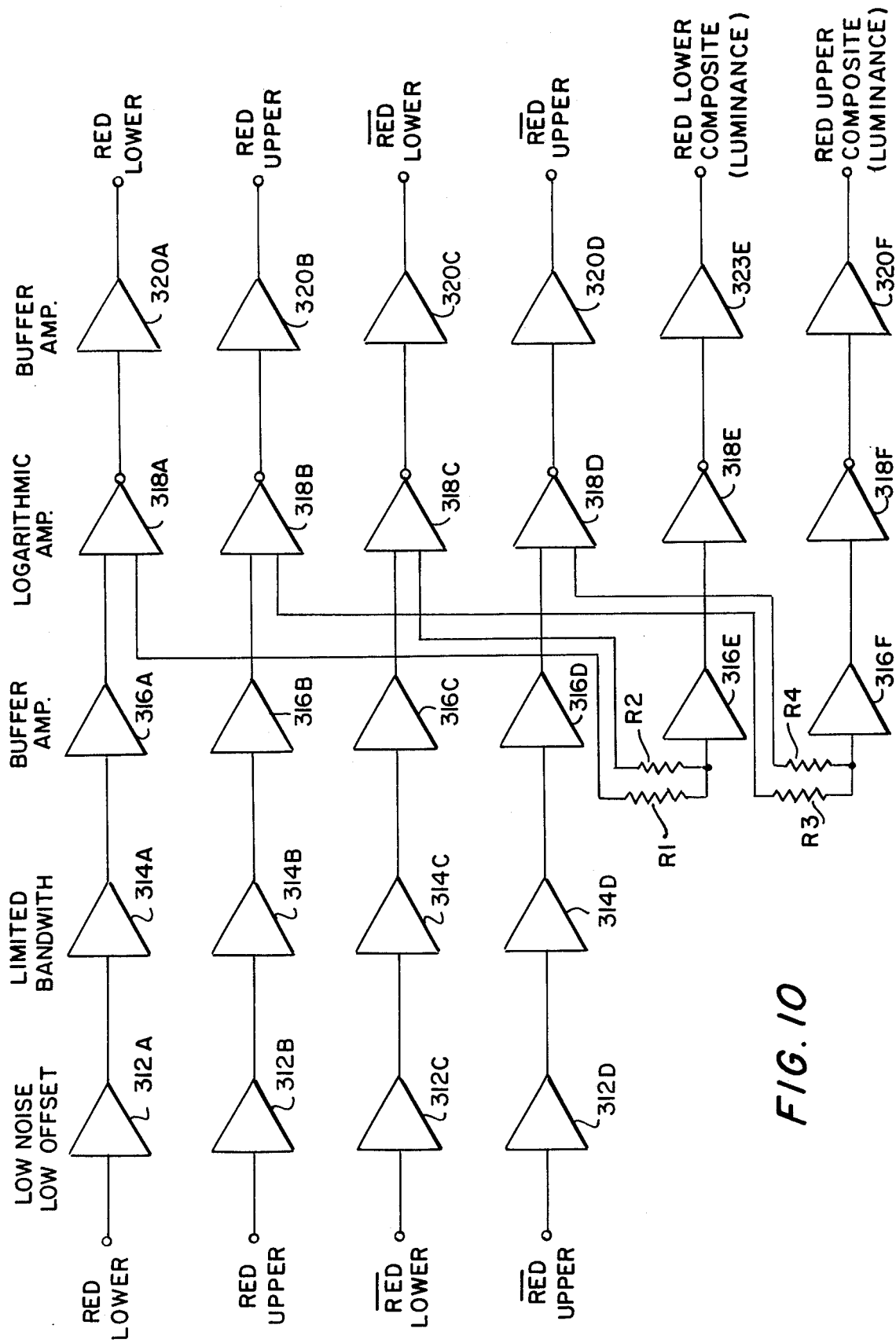
FIG. 10 is a block diagram of analog card portion of the present invention.

FIG. 10 is a block diagram of a logic card 310 which is used to process the signals from the photodiodes contained within the optical scanner 160. The output from the lower red photodiode 300A is input to a first low noise amplifier 312A. The output from the upper red photodiode 300B is input to a second low noise amplifier 312B. Similarly, the output from the lower not red photodiode 298A is input to a third low noise amplifier 312C and the output from the upper not red photodiode 298B is input to a fourth low noise amplifier 312D. The amplifiers 312 A, B, C, D, have been selected for low offset characteristics in order to faithfully reproduce the electrical signals from the optical detector 160. In order to reduce the effect of noise on the accuracy of signal reproduction each amplifier 312 is followed by a limited band width amplifier 314. The limited band width amplifier cuts off the high frequency response of the low noise 312 amplifiers which is not required in the cover recognition process. A series of buffer amplifiers 316 A-F are then connected after each limited band width amplifier 314 so as to match impedance levels between each amplifier 314 and a series of logarithmic amplifiers 318 A-F. Each of the buffer amplifiers 316 is fed into a respective logarithmic amplifier 318. A portion of the red lower signal is taken from the input to the first logarithmic amplifier 318A and mixed with a portion of the not red lower signal taken from the input of third logarithmic amplifier 318C. The logarithmic amplifiers are isolated from the summing point by a pair of isolation resistors $R_1$ and $R_2$. The common function point between resistors $R_1$ and $R_2$ are input to a fifth buffer amplifier 316E. In a like manner, a portion of the red upper signal is taken from the input to the second logarithmic amplifier 318B and mixed with a portion of the not red upper signal taken from the input to the fourth logarithmic amplifer 318D. The logarithmic amplifiers are isolated from the summing point by a pair of isolation resistors $R_3$ and $R_4$. The common function point between resistors $R_3$ and $R_4$ are input to a sixth buffer amplifier 316F. The output of the fifth buffer amplifier 316E is input to a fifth logarithmic amplifier 318E and the output of the sixth buffer amplifier 316F in input to a sixth logarithmic amplifier 318F. The logarithmic amplifiers 318A-F have a transfer function such that the output is a product of the input times the base to the 1.58 power. The output of each logarithmic amplifier 318 A-F is connected to a respective buffer amplifier 320 A-F for impendance matching and isolation.

The output of the logic card 10 is a set of logarithmically amplified and band width limited signals corresponding to the red lower, the red upper, the not red lower and the not red upper signals. A synthesized pair of signals are available as output from the E and F channels. The E channel yields a lower composite signal corresponding to the luminance of the lower portion of the scanned cover 12 and the F channel yields an upper composite signal corresponding to the luminance of the upper portion of cover 12.

Figure 11:
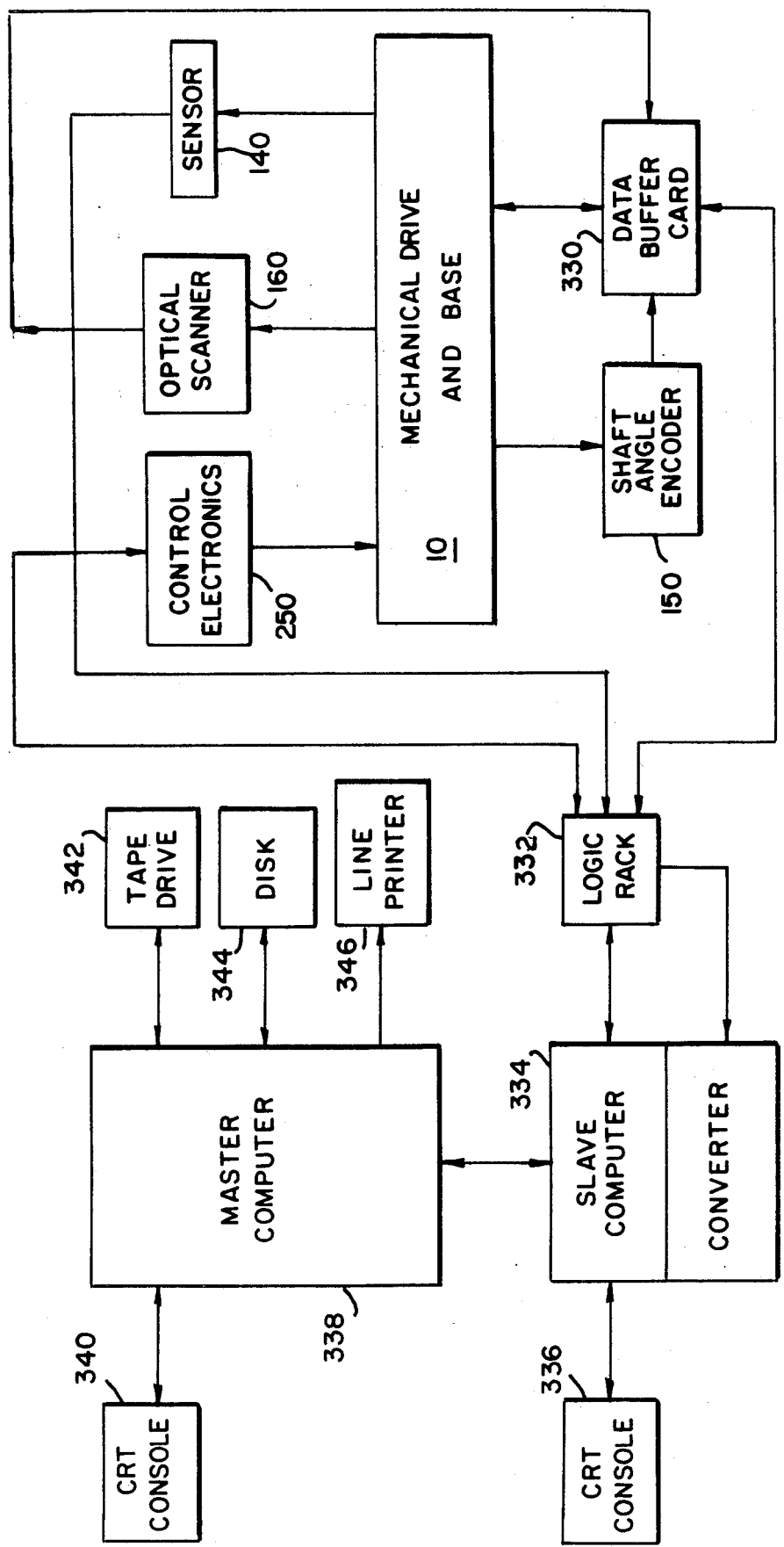
FIG. 11 is a block diagram of the mechanical and electronic portion of the present invention.

FIG. 11 shows the cooperation between the mechanical drive 10 and the electronic portion of the present invention. The mechanical drive 10 has associated with it the sensor 140. The function of sensor 140 is to detect the leading edge and trailing edge of cover 12 as well as to read the code punched into the training cover. The ouput of sensor 140 is fed to a logic rack 332. Associated with the function of sensor 140 is the shaft angle encoder 150. Shaft angle encoder 150 provides an output signal proportional to the speed of the cover 12 as it passes sensor 140. The shaft angle encoder 150 output is fed to a data buffer card 330 for conditioning and then transmits its signal to the logic rack 332. Optical scanner 160 feeds its signals to the data buffer card 330 for conditioning before sending them to the logic rack 332. The data buffer card 330 also receives instructions from the logic rack 332 which it interfaces with the mechanical drive 10. Similarly the control electronics 250 transmits signals to and receives signals from the mechanical drive 10. The control electronics 250 also transmits and receives signals from the logic rack 332.

The purpose of logic rack 332 is to condition the signals into and out of a slave computer 334 so that incoming signals match the logic levels of computer 334 and outgoing signals will drive the electronics they are connected to. Logic rack 332 also contains the analog card of FIG. 10. The analog card output from the logic rack 332 is connected to the A/D convertor portion of computer 334. The A/D convertor converts the analog output of the analog card of FIG. 10 to a digitized signal compatible with the requirements of computer 334. The computer 334 has associated with it a CRT console 336 where data from computer 334 may be displayed.

The function of the computer 334 is to be trained to recognize training covers in a training mode and to associate the cover signature with the associated book code punched into the training cover. In the operating mode the computer 334 then identifies covers having the same signature as the training cover. When such a cover is identified the computer 334 outputs a signal to a master computer 338. The master computer 338 performs all the house keeping functions. The master computer 338 is shown connected to a CRT console 340, a tape drive 342, a disk memory 344 and a line printer 346. All of the foregoing are well known to persons skilled in the art who are familiar with their connection and function.

OPERATION OF THE PREFERRED EMBODIMENT

The sorting machine of the present invention has two modes of operation. The first mode is a training mode for training the machine to recognize the "signature" of a particular cover 12 and an operating mode as its second mode. In the operating mode the machine 10 using the computers sorts through a collection of covers and by comparing the stored signature of the training cover with the "signature" of each cover being sorted identifies the cover being sorted as the same as or different from the training cover. The computers then instruct the transport portion 10 to shred like covers or to collect unlike covers for reuse. When the covers are recognized and shredded the housekeeping master computer 338 keeps a count of the covers recognized and performs the required billing.

The technique used to achieve the cover recognition in this invention represents a commercial application of the discipline known as pattern recognition. Prior to the invention of this sorter, a year was devoted to the analysis of thousands of book covers from which the recognition system evolved. The recognition system consists of sampling window 272 of each cover 12 as it passes in front of optical scanner 160. The width of the sampled window 272 is defined by the fibre optic windows 288, 290, 292 and 294. The window width is on the order of 1/20 of an inch.

It was further determined in the aforementioned studies that the recognition system will achieve greater accuracy by scanning the upper portion 276 and the lower portion 278 of the window 272. An additional degree of accuracy was introduced by making a color analysis of the cover 12 using the mirror 286 to separate incoming light into a red image and a not red image as previously described in conjunction with the description of FIG. 9. The upper red and not red signals together with the lower red and not red signals are amplified and processed by an analog card 310. The method of processing was again part of the above mentioned analysis the result of which was to process each color channel as described in the description for the analog card 310. The output of the logic card 310 is then processed by the slave computer 334 which has been programmed to make the analog to digital conversion required by the computer 334 to recognize book covers.

During the training mode of operation, the slave computer receives a book code identifying the book cover being scanned which is stored with the electronic "signature" as will be further described. The book code information and "signature" are transferred to the master computer and stored on the disc.

In order to more fully understand the present invention, the following description explains the operation of the sorting machine. First a number of book covers 12 are placed in the book cover feed hopper 26 between the feed plate 36 and the switch lever 32. The feed belts 28 and 30 move the covers and the feed plate towards the switch lever until the microswitch 34 is activated and stops the feed belts from moving. At this time, the vacuum probe 38 has moved into the first position where the vacuum suction heads 62 contact the surface of a cover. Then, the rotation of shaft 54 moves cams 50 and 52 so as to pivot the vacuum probe 38 back and over towards the transport 14. Once the probe reaches the second position where the cover is adjacent the drive and pressure wheels 88 and 90, located at the end of the transport 14, the vacuum is blocked and the cover is fed by wheels 88 and 90 into the path of movement between the guide rails 82 and 84. The vacuum feed 20 begins the cycle again and moves back to the first position where it can then pick up another cover. This process is very rapid and can deliver approximately five covers per second to the transport. Then the cover begins to move down between the guide rails along one of its edges. This movement is continued due to the series of drive and pressure wheels located along the length of the transport at a distance providing for constant contact with a cover passing therethrough.

As the cover moves through the transport 14, it first passes a double cover removal assembly 110. In the event that two covers are stuck together, the detector assembly 112 actuates the pivot gate actuator 126 and causes a pivot gate 120 to obstruct the path of movement and thereby directs the covers between wheel 132 and the curved guide support 134 and into an accumulation area 136.

Assuming the cover gets past assembly 110, it next passes sensor 140. The leading edge of the cover is recognized and a signal is sent to the slave computer. This signals the computer to begin to monitor the signal produced by the shaft angle encoder 150 as well as the output from the cover recognition device 152. This monitoring continues until the trailing edge of the cover is detected by sensor 140. If the slave computer recognizes the "signature" of the cover which includes recognizing the light reflected from the cover and the location of the light on the cover as determined by the angle encoder, the data is sent to the master computer. When the trailing edge of the cover is recognized by the sensor 140, the slave computer is reset in preparation for the next cover passing through the transport.

In the event that the cover has been recognized, it continues to pass through the transport and into the cover shredder assembly 200 where the cover is destroyed. On the other hand, in the event that the cover is not recognized by the slave computer, the non-detected cover removal assembly is activated. More specifically, the detector assembly 186 signals the pivot gate actuator to close the pivot gate 176 and divert the unrecognized cover between the driving wheel and the curved support wall and into the accumulation area 196.

The sorting machine is an adapted system and is capable of learning to discriminate any set of graphic patterns presented to it. In order to "train" the system a "training set" must be established having at least one cover for each title to be recognized. A typical training cover is specifically coded with a binary punched code (See FIG. 8) corresponding to a number related to its title. The machine can learn to associate the visual pattern of the cover with its catalogue number. In order to train the machine, the computer system is issued directives and the punched cover is sent through the transport device. The sensor 140 emits a signal corresponding to the holes punched in the card and the cover recognition device 152 responds to the pattern on the cover and reduces it to a signal, which in conjunction with the output of shaft angle encoder 150, represents the "signature" of the book cover. The book signature information is stored in the slave computer. When the training of the computer is being performed, the training bin assembly 220 is put into place so that the covers which have been punched can be collected in the accumulation area 234.

The various electronic signals provided from the sorting machine may be monitored in a conventional way by the computer to indicate on the box 250 or by a sound system as to whether the machine is jammed or the accumulation area 136 and/or 196 are filled. Also, once the recognized covers are tabulated in the master computer the data can be processed to perform many different functions, such as for example, payrolls, inventory controls, purchasing, and royalty calculations.

It can be understood by one skilled in the art that the sorting machine of the present invention, accurately sorts covers, operates very quickly and efficiently, removes covers that are either stuck together or not recognized and shreds the remainder of the covers which have been recognized.

While there has been described what is at present considered to be the preferred embodiment of the invention, it will be obvious to those skilled in the art that various changes and modifications may be made therein, without departing from the invention, and it is, therefore, aimed in the appended claims to cover all such changes and modifications as fall within the true spirit and scope of the invention.

What is claimed is:

1. A sorting machine for sorting sheets of different optical indicia, comprising:

transport means for moving said sheets in a path;

means for converting optically responsive indicia on said sheets to an electrical analog signal with said sheets moving along said path; said means for converting optically responsive indicia being comprised of an optical scanner having an elongated window whereby said optical scanner is responsive to a portion of said sheet, said means for converting optically responsive indicia further comprising an analog card for processing said electrical signal whereby said analog signal is enhanced;

computer means operably connected to said optical converting means for converting said analog signal to a digital signal, and for storing and comparing said digital signals, and having a training mode and an operating mode wherein said training mode comprises;

a training sheet being formed with optically responsive encoding indicia, said indicia being converted to a digital signal and stored by said computer means; and said means for converting optically responsive indicia further comprising a sensor having a pair of photodiodes whereby a two line punched code on a portion of said training cover is converted to a pair of electrical signals for input to said computer means, said pair of photodiodes feeding an electrical output signal from each photodiode to said computer means for comparison whereby an edge of said sheet is detected;

wherein said operating mode comprises sheets having common optical indicia as said training sheet, said latter said sheets being moved along said path information and digital signal generated relative thereto and compared with the stored training mode digital information, and when a comparison is found, said operating mode sheets are thereby detected, said transport means comprising a shaft angle encoder which feeds a series of pulses to said computer means whereby the speed of said sheet movement is measured.

2. The machine of claim 1, wherein said analog card is comprised of means to amplify said analog signal so as to limit the range of frequencies to be amplified whereby noise signals and other extraneous electrical signals are suppressed.

3. The machine of claim 2, wherein said analog card is comprised of means to further amplify said limited range of frequencies in a logarithmic amplifier whereby said analog signal is further modified.

4. The machine of claim 3, wherein said optical scanner is further comprised of a lens which images said indicia onto photodiode means within said optical scanner and having a color separation means positioned between said lens and said photodiode means whereby said photodiode is made responsive to a color characteristic of said indicia.

5. The machine of claim 4, wherein said color separation means comprises a color separation mirror so that a first imaged portion of said indicia is transmitted by said mirror to a first photodiode means and a second imaged portion of said indicia is reflected to a second photodiode means whereby said analog signals are available from both portions of said imaged indicia.

6. The machine of claim 5, wherein said elongated window is formed by diaphragm means proximate said photodiode means.

7. The machine of claim 6, wherein said diaphragm means is formed of a fibre optic bundle optically coupled to said photodiode means.

8. The machine of claim 7, wherein said first imaged portion is red and said second imaged portion is not red.

9. The machine of claim 8, wherein an upper fibre optic bundle and a lower fibre optic bundle together comprise said elongated window so that two analog signals are available from each imaged indicia.

10. The machine of claim 9, wherein said red imaged portion yields an upper red analog signal and a lower red analog signal and said not red imaged portion yields an upper not red analog signal and a lower not red analog signal for use of said computer means.

11. The machine of claim 10, wherein said computer means comprises a first computer for comparing said digital signals and a second computer for storing said digital signals during said training mode.

12. The machine of claim 5, wherein said first imaged portion is color specific to one color and said second image portion is not color specific to said one color.

* * * * *